Sept. 16, 1941. E. F. SARVER 2,255,943
HEAT MOTOR
Filed Dec. 12, 1938

INVENTOR
Emmett F. Sarver.
BY Arthur L. Brown
ATTORNEY

Patented Sept. 16, 1941

2,255,943

UNITED STATES PATENT OFFICE 2,255,943

HEAT MOTOR

Emmett F. Sarver, Hollywood, Calif.

Application December 12, 1938, Serial No. 245,122

8 Claims. (Cl. 60—23)

This invention relates to motors of the type actuated responsive to alternate heating and cooling of thermally responsive elements, and has for its principal object to provide a motor of this character which is of simple, rugged construction, and capable of developing high torque at low speeds.

It is a further object of the invention to provide a heat motor constructed to generate a flexible torque under variable loads thereby avoiding necessity of changed speed mechanisms.

Other objects of the invention are to provide a heat motor that is safe in operation, adapted for ease of control, and which is of low weight power ratio.

In accomplishing these and other objects of the invention, as hereinafter set forth, I have provided improved details of structure, the preferred form of which is illustrated in the accompanying drawing, wherein.

Figure 1:
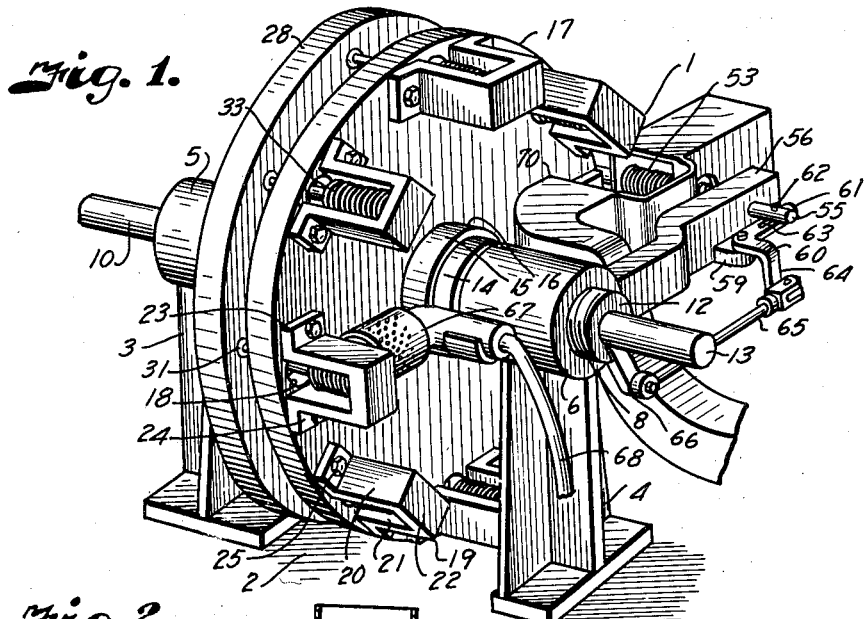
Fig. 1 is a perspective view of a heat motor constructed in accordance with the present invention.

Referring more in detail to the drawing:

1 designates a heat motor constructed in accordance with the present invention, and which includes a supporting frame having a base 2 and spaced bearing supports 3 and 4 carrying bearings 5 and 6. The bearings 5 and 6 have bores 7 and 8 arranged with the axes thereof in angular relationship with respect to each other. Mounted in the bore 7 of the bearing 5 is a bushing 9 rotatably journalling a shaft 10 by which power of the motor is delivered to a driven mechanism (not shown).

Figure 2:
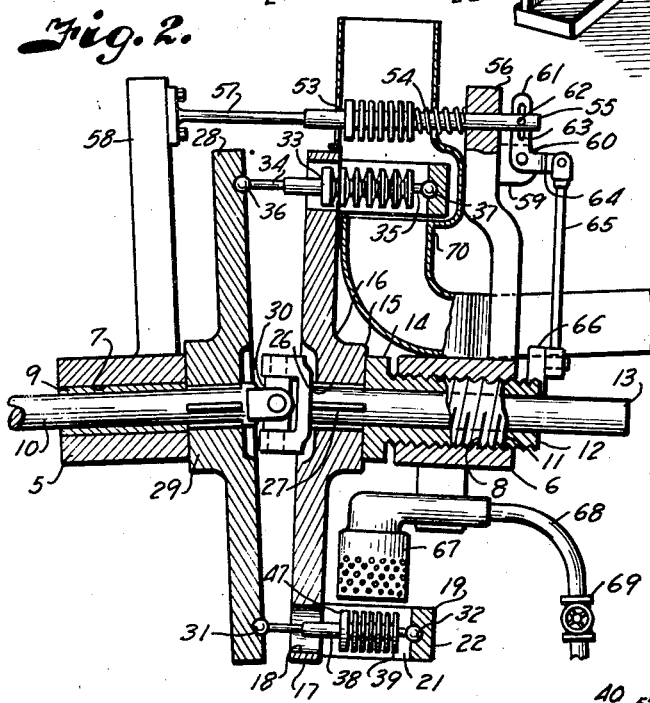
Fig. 2 is a horizontal section through the motor.
Figure 3:
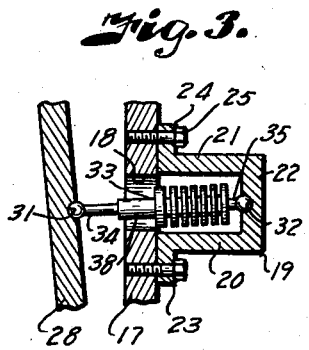
Fig. 3 is an enlarged fragmentary section through the rotors, particularly illustrating mounting of the thermally responsive elements.

In the illustrated instance, the bearing 6 has its axis extending in the horizontal plane of the axis of the bearing 5 but at an obtuse angle thereto as clearly shown in Fig. 2. The bore of the bearing is internally threaded, as at 11, to mount a longitudinally adjustable bushing 12 which rotatably journals a shaft 13 which, due to the angular positioning of the bearings, extends at an angle to the shaft 10. The bushing 12 has a flanged head 14 abutting against the hub 15 of a rotor 16 and is rotatably threaded in the bearing. The rotor 16 includes a disk-like portion 17 concentric with the hub and has arcuately spaced openings 18 extending therethrough at points inset from the periphery thereof for a purpose later described.

Mounted on the outer face of the rotor 16, in registering alignment with the respective openings, are substantially yoke-shaped brackets 19, including spaced legs 20 and 21 connected at their outer ends by a cross bar 22 and which have feet 23 and 24 at their opposite ends secured to the side of the disk by fastening devices, such as cap screws 25.

The hub 15 has a splined bore 26 slidably engaging splines 27 on the shaft 13 so that when the threaded bushing is rotated the rotor is shifted to and from a complementary rotor 28 having a hub 29 abutting against the bearing 5 and splined to the shaft 10. The shafts 10 and 13 are coupled between the rotors by a flexible or universal joint 30 so that the rotors are kept in aligning, rotational relation to each other. Formed in the inner face of the rotor 28, in aligning registry with the axis of the openings 18, are hemispherically shaped sockets 31 aligning with similarly shaped sockets 32 in the cross bars 22 of the yoke shaped brackets that are attached to the outer side of the rotor 16. Supported in the aligning sockets are thermal expansive and contractive elements 33, each including rod-like stems 34 and 35 having ball terminals 36 and 37 engageable in the respective pairs of sockets 31 and 32. The stem 34 includes a cylindrical socket or sleeve portion 38 that slidably receives the stem 35 so that the sections are adapted to telescope relatively to each other incidental to rotation of the respective disks and in accordance to the variable spacing therebetween by reason of the angular relationship of the shafts.

Figure 4:
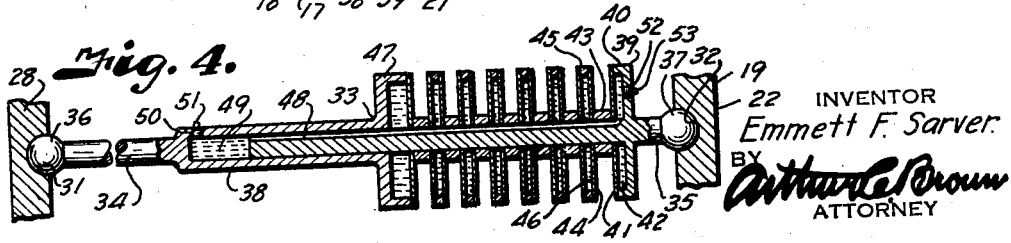
Fig. 4 is an enlarged longitudinal section through one of the thermally responsive elements.

Formed on the stem 35 is a preferably rigid disk-like head 39 having a lateral perimetrical flange 40 to which is secured a flexible disk or diaphragm 41 which is adapted to move longitudinally on the stem so as to form an expandable and contractible chamber 42. The periphery of the disk is attached to the lateral flange by a leak-proof joint and its inner circumference is sealingly connected with a spacing sleeve 43 that is slidable on the stem 35. Sealingly engaged with the opposite end of the spacer 43 is a similar flexible diaphragm 44 sealingly connected at its outer periphery with a spacer ring 45 sealed to a complementary diaphragm to form an expandable chamber 46 similar to the chamber 42. Also mounted on the stem 35 are similarly constructed expansive units, terminating in a rigid head 47 similar to the head 39, the head 47 being attached to the cylindrical socket 38 as shown in Fig. 4.

All of the expansive chambers are interconnected by a channel 48 extending longitudinally in the side of the stem 35 and which communicate at one end thereof with a chamber 49 provided in the socket 38. An expansive fluid is injected in the chamber 49 to fill all of the chambers within the expandable element through an inlet port 50 normally closed by a plug 51, the air being exhausted from the opposite end of the expansive element through a port 52 in the head 39 and which is closed by a plug 53. It is thus obvious that when the fluid expands the flexible disk portions form an accordion-like bellows and that the stems are moved apart exerting thrusts against the rotors, as later described.

The expansive substance is preferably one having a high rate of expansion upon slight change in temperature, for example a liquid substance such as sulphur dioxide may be used. When the substance is a liquid, a sufficient amount is injected into the expansive elements so that they expand lengthwise at the filling temperature sufficiently to seat the balls 36 and 37 in the sockets 31 and 32 at a point where the pairs of hemispherical sockets of the respective rotors have the narrowest spacing, as shown in Fig. 2, that is, the unit will be completely filled with liquid when it is at its minimum length at ordinary temperature.

Since the liquid will expand rapidly with a slight rise in temperature, it will be seen that if heat is applied to the shortest unit, the unit carried between the narrowest spacing of the respective rotors, the unit will tend to expand and become longer. In order for the unit to lengthen it exerts an outward force against the rotors, causing them to revolve to a position where the expanding unit can satisfy its new length requirements.

It is important that the minimum length of the liquid filled thermo-expansive elements correspond to the distance between the sockets 31 and 32 of the rotors at the point of their narrowest spacing. If this distance is not maintained any drop in temperature below that at which the elements were filled would result in contraction of the liquid which would leave space within the bellows. Consequently the full effective force of the expansive units can not come into play before the elements begin to elongate incidental to actuation of the rotors. It is, therefore, obvious that there would be a loss of efficiency. Likewise, should the atmospheric temperature, or working temperature of the motor, increase beyond that at which the bellows were completely filled with the liquid, the liquid would expand so that the units become longer than the spacing between the pairs of sockets at the narrowest portions of the rotors. Consequently it would be impossible for the expansive elements to be carried through the narrowest space due to the inability of the liquid to compress. It is, therefore, necessary to provide compensating means to control spacing of the rotors automatically so as to compensate for variable length of the expansive elements incidental to temperature variation in the expansive elements at the time they approach the points of narrowest spacing. I have, therefore, provided a compensating unit 53 which is of identical construction to the expansive elements and so arranged that the expansive and contractive forces thereof work against a spring 54 sleeved over a rod 55 similar to the rod 35 and having its end bearing against an arm 56 extending radially from the bearing 6 in which the rod is slidably mounted. The opposite end of the expansive element is supported by a rod 57 attached to an arm 58 extending from the bearing 5, as shown in Fig. 2. Pivotally mounted on an ear 59 extending from the arm 56 is a bell crank lever 60 having one arm 61 overlapping the projecting end of the rod 55 and which is connected therewith by a pin 62 extending through the rod and through an elongated slot 63 in the arm. The other arm 64 of the bell crank is pivotally connected by a link 65 with a rocker arm 66 extending laterally from the threaded bushing 12. It is thus apparent that expansion and contraction of the compensating bellows will reciprocate the rod 55 in the arm 56 causing rocking movement of the bell crank and partial rotation of the bushing so that the rotor 16 is automatically adjusted to and from the rotor 28. For example, should the working temperature of the motor increase, the bellows 53 will expand, exerting pressure on the spring 54. Upon overcoming the resistance of the spring, the rod 55 will rock the bell crank to effect movement of the rotor 16 away from the rotor 28 thereby compensating for increase in length of the heat responsive elements. Upon drop of working temperature, the fluid in the compensating bellows will contract so that the spring comes into play to rock the bell crank in the opposite direction, reversing movement of the bushing and causing the rotor 16 to move closer to the rotor 28 compensating for contraction in the heat responsive elements.

In order to heat the bellows successively at the sides of the disk having the narrowest spacing, I provide a heater 67 that is supported from the bearing 6 and supplied with a combustible fuel, such as gas, through a pipe 68 under control of a valve 69. Upon rise in temperature of the heated bellows, it will tend to expand to effect rotation of the disks, which, of course, carry the bellows away from the heat of the burner and bring an unheated bellows into the heat zone of the burner. Expansion of the fluid in the heated bellows causes gradual expansion of the elements as controlled by the gradual increase in rotor spacing toward the opposite side of the shafts where the bellows are cooled to effect contraction of the expansible fluid. This is effected in the illustrated instance by discharging a blast of air onto the bellows through a nozzle 70 also supported by the bearing 6. The bellows are thus alternately heated at one diametrical side of the disk and cooled at the opposite side, so that movement of the rotors is continuous to impart rotative movement to the power shaft 10. Power and speed of the motor is readily controlled by regulating heat of the burner.

From the foregoing it is obvious that I have provided a heat engine which is of simple construction and which may be constructed of relatively light weight so that it has a low weight power ratio.

What I claim and desire to secure by Letters Patent is:

1. A motor of the character described including a thermo-responsive element, rotary means supporting said element, means for connecting said element with the rotary means to effect rotation thereof, means supported on one side of said rotary supporting means to heat said element, means on the opposite side for cooling said element, and compensating means responsive to temperature at the cooled side of said rotary supporting means for adjusting said supporting means in accordance with variable working temperatures of the motor.

2. A motor of the character described including an expanding and contracting element, rotary means supporting said element, means connecting said element with the supporting means for effecting rotation thereof incidental to expansion and contraction of said element, means for alternately expanding and contracting said element, and temperature responsive compensating means adjusting said element for any change occurring in working temperature of the motor.

3. A motor of the character described including a pair of rotors, means mounting the rotors with their rotary axes in angular relationship to each other, a universal joint interconnecting said rotors, a thermo-responsive element carried between the rotors and arranged to exert pressure therebetween to effect rotation thereof, heating means supported at one diametrical side of the rotors to effect heating of said element, cooling means supported at the opposite diametrical side for cooling said element, whereby said element is successively expanded and contracted to effect rotation of said rotors, an adjusting means having an adjusting connection with one of said rotors, and a thermostatic element located adjacent the cooled side of the rotors for actuating said adjusting means.

4. A motor of the character described including a pair of rotors, means mounting the rotors with their rotary axes in angular relationship to each other, means interconnecting said rotors, a thermo-responsive element carried between the rotors and arranged to exert pressure therebetween to effect rotation thereof, heating means supported at one diametrical side of the rotors to effect heating of said element, means supported at the opposite diametrical side for cooling said element, whereby said element is successively expanded and contracted to effect rotation of said rotors, means for varying the spacing of said rotors to compensate for the working temperature changes in said element, and temperature responsive means having actuating connection with said space varying means.

5. A motor of the character described including a base, spaced bearings on the base having their axes arranged in angular relationship to each other, shafts rotatably mounted in said bearings, a universal joint connecting said shafts, spaced rotors on the respective shafts, a thermo-responsive element having end portions engaging between said rotors to exert variable pressure on said rotors, means threaded in one of said bearings and engaging one of said rotors to vary the spacing thereof with the other rotor, compensating means responsive to working temperature of said motor and connected with said threaded means to effect automatic actuation thereof, and means for alternately heating and cooling said thermo-responsive element.

6. A motor of the character described including a pair of rotors, a thermo-responsive element carried between the rotors and arranged to exert variable expansive and contractive pressure therebetween to effect rotation thereof, heating means supported at one diametrical side of the rotors to effect heating of said element, means supported at the opposite diametrical side for cooling said element, whereby said element is successively expanded and contracted to effect rotation of said rotors, temperature responsive means located on the cooled side of said rotors, and rotor adjusting means connected with the temperature responsive means to compensate for variation in the contracted length of said thermo-responsive element at different working temperatures of the motor.

7. A motor of the character described including an expanding and contracting element, means supporting said element, a power delivery means, means connecting said element with the power delivery means, means for alternately expanding and contracting said element, temperature responsive means, and actuating means interconnecting the temperature responsive means with the supporting means to adjust said supporting means for variation in contraction of said element incidental to variable working temperatures of the motor.

8. A motor of the character described, including an expanding and contracting element capable of expanding and contracting responsive to changing temperature influences acting on said element, means supporting said element within a varying temperature zone to effect said expansion and contraction within predetermined limits, a power delivery means, means connecting said expanding and contracting element with the power delivery means, means varying the temperature in said zone for alternately expanding and contracting said element, and temperature responsive compensating means in said zone for adjusting said supporting means responsive to any change occurring in working temperature of the motor tending to expand and contract said element beyond said limits.

EMMETT F. SARVER.